United States Patent
Opprecht et al.

(10) Patent No.: US 12,246,379 B2
(45) Date of Patent: Mar. 11, 2025

(54) METHOD FOR MANUFACTURING AN ALUMINIUM ALLOY PART BY ADDITIVE MANUFACTURING AND ALUMINIUM ALLOY PART OBTAINED ACCORDING TO THE METHOD

(71) Applicant: COMMISSARIAT À L'ÉNERGIE ATOMIQUE ET AUX ÉNERGIES ALTERNATIVES, Paris (FR)

(72) Inventors: Mathieu Opprecht, Grenoble (FR); Jean-Paul Garandet, Grenoble (FR); Fernando Lomello, Grenoble (FR); Guilhem Roux, Grenoble (FR); Mathieu Soulier, Grenoble (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 689 days.

(21) Appl. No.: 17/595,164

(22) PCT Filed: Apr. 30, 2020

(86) PCT No.: PCT/EP2020/062126
§ 371 (c)(1),
(2) Date: Nov. 10, 2021

(87) PCT Pub. No.: WO2020/229197
PCT Pub. Date: Nov. 19, 2020

(65) Prior Publication Data
US 2022/0212258 A1    Jul. 7, 2022

(30) Foreign Application Priority Data
May 13, 2019    (FR) ...................... 1904930

(51) Int. Cl.
*B22F 10/28* (2021.01)
*B22F 10/34* (2021.01)
(Continued)

(52) U.S. Cl.
CPC .............. *B22F 10/28* (2021.01); *B22F 10/34* (2021.01); *B33Y 10/00* (2014.12); *B33Y 70/00* (2014.12);
(Continued)

(58) Field of Classification Search
CPC .......... B22F 10/28; B22F 10/34; B22F 10/36; B22F 10/64; B22F 2301/052;
(Continued)

(56) References Cited

U.S. PATENT DOCUMENTS

2017/0016095 A1    1/2017 Karlen et al.
2018/0161874 A1    6/2018 Nuechterlein et al.
(Continued)

FOREIGN PATENT DOCUMENTS

WO    2018144323    8/2018

OTHER PUBLICATIONS

International Search Report for International Application No. PCT/EP2020/062126 dated Sep. 3, 2020, 3 pages.
(Continued)

*Primary Examiner* — Robert G Bachner
(74) *Attorney, Agent, or Firm* — Pearne & Gordon LLP

(57) ABSTRACT

A method for manufacturing an aluminium alloy part by additive manufacturing comprising a step during which a layer of a mixture of powders is melted locally and then solidified, wherein the mixture of powders comprises:
—first particles—comprising at least 80 wt % of aluminium and up to 20 wt % of one or more additional elements, and
—second particles—of yttria, the volume percentage of
(Continued)

second particles in the mixture of powders preferably ranging from 0.5% to 5%.

14 Claims, 1 Drawing Sheet

(51) Int. Cl.
| | |
|---|---|
| *B22F 10/36* | (2021.01) |
| *B22F 10/64* | (2021.01) |
| *B23K 15/00* | (2006.01) |
| *B23K 26/342* | (2014.01) |
| *B23K 103/10* | (2006.01) |
| *B33Y 10/00* | (2015.01) |
| *B33Y 70/00* | (2020.01) |
| *B33Y 80/00* | (2015.01) |

(52) U.S. Cl.
CPC ............... *B22F 10/36* (2021.01); *B22F 10/64* (2021.01); *B22F 2301/052* (2013.01); *B22F 2302/25* (2013.01); *B22F 2304/10* (2013.01); *B23K 15/0086* (2013.01); *B23K 26/342* (2015.10); *B23K 2103/10* (2018.08); *B33Y 80/00* (2014.12)

(58) Field of Classification Search
CPC .. B22F 2302/25; B22F 2304/10; B33Y 10/00; B33Y 70/00; B33Y 80/00; B23K 15/0086; B23K 26/342; B23K 2103/10; C22C 32/0036; C22C 1/0416; Y02P 10/25
See application file for complete search history.

(56) References Cited

U.S. PATENT DOCUMENTS

| | | |
|---|---|---|
| 2019/0039183 A1 | 2/2019 | Morton et al. |
| 2019/0245224 A1 | 8/2019 | Lacroix et al. |
| 2019/0326621 A1 | 10/2019 | Planque et al. |
| 2019/0372137 A1 | 12/2019 | Planque et al. |
| 2020/0313217 A1 | 10/2020 | Planque et al. |
| 2020/0360993 A1 | 11/2020 | Opprecht et al. |
| 2020/0403261 A1 | 12/2020 | Bernard et al. |
| 2021/0344022 A1 | 11/2021 | Planque et al. |

OTHER PUBLICATIONS

French Search Report for French Application No. FR 1904930 dated Feb. 6, 2020, 1 page.
Martin et al., "3D printing of high-strength aluminium alloys," Nature, Sep. 21, 2017, vol. S49, 15 pages.
Chu et al., "Sintering of aluminum nitride by using alumina crucible and MoSi2 heating element at temperatures of 1650 C. and 1700 C.," Ceramics International, 2009, 7 pages.
U.S. Appl. No. 17/287,841, filed Apr. 22, 2021.
U.S. Appl. No. 17/415,444, filed Jun. 17, 2021.

METHOD FOR MANUFACTURING AN ALUMINIUM ALLOY PART BY ADDITIVE MANUFACTURING AND ALUMINIUM ALLOY PART OBTAINED ACCORDING TO THE METHOD

CROSS-REFERENCE TO RELATED APPLICATIONS

This is a National Stage application of PCT international application PCT/EP2020/062126, filed on Apr. 30, 2020, which claims the priority of French Patent Application No. 1904930, filed May 13, 2019, both of which are incorporated herein by reference in their entirety.

TECHNICAL FIELD

The present invention relates to the general field of manufacturing an aluminium alloy part by additive manufacturing.

The invention relates to a method for manufacturing aluminium alloy parts using a powder mixture containing particles based on aluminium and yttrium-oxide particles.

The invention also relates to an aluminium alloy part obtained with this method.

The invention is particularly advantageous since it makes it possible to remedy the problems of hot cracking of aluminium alloys cracking in the additive manufacturing methods involving melting.

The invention has applications in numerous industrial fields, and in particular in the automobile, aeronautical or energy fields (for example, for manufacturing heat exchangers).

PRIOR ART

The various methods for manufacturing metal alloy parts by additive manufacturing (also referred to as 3D printing) have the common point of using the raw material in the form of powders and forming the metal alloy via a step of fusing these powders.

The various additive manufacturing methods concerned include, in particular, powder bed melting (PBF) methods and the methods for depositing material under concentrated energy (or DED, standing for "directed energy deposition").

The PBF methods consist in melting certain regions of a bed of powder, for example by means of a laser beam. The DED methods consist in bringing the solid material, for example in the form of wire or powder, melting it, for example by means of a laser beam, and depositing the molten material.

With such methods, it is possible to produce parts industrially, with a simple or complex form, having satisfactory mechanical properties.

However, some aluminium alloys are subject to problems of hot cracking resulting from a columnar dendritic solidification, giving rise to a microstructure sensitive to thermomechanical stresses during solidification, in particular for a solid fraction ranging from 0.9 to 0.98.

To remedy this drawback, various solutions have been envisaged.

For example, it is possible to modify the chemical composition of the alloy of the powder. This is the case for example with the Scamalloy grade (APWORKS©). This is a light alloy comprising aluminium and magnesium, modified with zirconium and scandium, developed specifically for additive manufacturing. During solidification, $Al_3Sc$ primary particles precipitate from the liquid and act as seeds for growth of grains of the Al matrix. The scandium therefore affords refinement of the microstructure and the development of an equiaxial dendritic solidification. However, scandium is a particularly expensive element, which considerably increases the costs of the raw material (by a factor of 4 compared with a standard aluminium powder).

Another solution consists in adding to the aluminium powder nanoparticles of a so-called seeding material, less expensive than scandium, for promoting equiaxial solidification.

In the document WO 2018/144323 A1, aluminium alloy powders are mixed with Zr, Ta, Nb or Ti nanoparticles or nanoparticles made from one of the oxides, nitrides, hydrides, borides, carbides and aluminides thereof for manufacturing parts made of aluminium alloy by additive manufacturing. Among the various example embodiments described, parts are manufactured by selective laser melting (also denoted SLM) using for example a mixture comprising:
- aluminium and nanoparticles of tantalum 50 nm in diameter (1% by volume), or
- an aluminium alloy (Al7075 or Al6061) and zirconium nanoparticles 500-1500 nm in diameter (1% by volume).

In the document by Martin et al. "3D printing of high-strength aluminium alloys", Nature 549 (2017), pages 365-369, aluminium alloy powders of series 7075 (bimodal distribution at 15 μm and 45 μm) and 6061 ($d_{50}$ of 45 μm) were mixed with 1% by volume hydrogen-stabilised zirconium nanoparticles ($ZrH_2$) to remedy the problem of hot cracking of the aluminium alloys obtained by SLM. The nanoparticles are "electrostatically" assembled on the base powder to obtain a uniform distribution. No information is given on the granulometry of the nanoparticles used.

DESCRIPTION OF THE INVENTION

One aim of the present invention is to propose a method for manufacturing aluminium alloy parts not having any crack, the method having to be simple to implement and inexpensive.

For this purpose, the present invention proposes a method for manufacturing an aluminium alloy part by additive manufacturing comprising at least one step during which a layer of a mixture of powders is melted and then solidified, the mixture of powders comprising:
- raw materials comprising at least 80% by mass aluminium and up to 20% by mass one or more additional elements, and
- second yttrium oxide particles ($Y_2O_3$), the percentage by volume of second particles in the mixture of powders preferably ranging from 0.5% to 5%.

The invention is fundamentally distinguished from the prior art by adding yttrium oxide ($Y_2O_3$) particles to the powder based on aluminium. Adding such particles promotes an equiaxial solidification structure and thus eliminates cracking in the final part.

Against all expectations, the yttrium oxide gives rise to seeding particles of $Al_3Y$ by reaction with the aluminium in accordance with the following reactions:

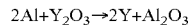

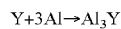

This is because, even if yttrium oxide appears to be more thermodynamically stable than alumina whatever the temperature (see the Ellingham diagram shown in FIG. 1 and obtained from data extracted from Chu et al. "Sintering of aluminium nitride by using alumina crucible and $MoSi_2$ heating element at temperatures of 1650° C. and 1700° C.", Ceramics International 35 (2009), 3455-3461), it has been observed that, during the additive manufacturing method, the $Al_3Y$ seeding phase is formed by decomposition of the yttrium oxide.

Alternatively or concomitantly, release of the Y metal may take place by dissolution of the oxide precursor (or of the second particles) in the metal bath.

It does not appear obvious that this $Al_3Y$ phase ($2^{nd}$ reaction) has the time to seed since the lifetimes of the molten metal baths formed during the method are relatively short (from around a hundred microseconds to one millisecond). At first sight, this in-situ reaction is neither thermodynamically nor kinetically favoured by the thermal conditions imposed by the method.

Advantageously, yttrium oxide is a stable oxide, easier to manipulate and/or store, compared with metal elements known for being strongly reducing.

Advantageously, the second particles have a largest dimension ranging from 5 nm to 2 μm, preferably from 10 nm to 400 nm, and even more preferentially from 30 nm to 50 nm.

Advantageously, the volume percentage of second particles in the mixture of powders ranges from 1% to 3%.

Advantageously, the first particles have a largest dimension ranging from 10 μm to 100 μm, for example from 10 to 45 μm, and preferably from 20 to 65 μm.

Advantageously, the additional elements are selected from Cu, Si, Zn, Mg, Fe, Ti, Mn, Zr, Va, Ni, Pb, Bi and Cr.

Advantageously, the aluminium alloy is the 7075 alloy, the 6061 alloy, the 2219 alloy or the 2024 alloy.

According to a first advantageous variant embodiment, the manufacturing method is a selective laser fusing method.

According to a second advantageous variant embodiment, the manufacturing method is a selective electron-beam melting method.

The method has many advantages:
  being simple to implement, since it suffices to mix powders. This is a dry-method step, quick to implement and simple to establish, whatever the quantity of powders;
  being inexpensive, and therefore advantageous from an industrial point of view. By way of illustration, the material cost of a 6061 aluminium alloy is approximately €60/kg and the material cost of a mixture of powders comprising 6061 aluminium alloy and yttrium oxide (2% by volume) is approximately €66/kg;
  being able to easily store/manipulate the yttrium oxide powder, since it is an oxide: there is no need to use an inert atmosphere;
  being able to use powders the particles of which have small dimensions since such yttrium oxide particles are not pyrophoric (unlike yttrium oxide particles with the same dimensions), which makes the method safer;
  being able to easily modify the volume ratio between the powders at the moment of powder mixing;
  being easily adaptable to any additive manufacturing method and for any aluminium alloy subject to the problem of hot cracking;
  being able to use the parameters conventionally used in additive manufacturing methods.

The invention also relates to an aluminium alloy part obtained according to the method described above, the part comprising yttrium oxide. The part is devoid of any cracking/crack.

Advantageously, the part is a heat exchanger.

Other features and advantages of the invention will emerge from the remainder of the description that follows.

It goes without saying that this remainder of the description is given only by way of illustration of the object of the invention and must under no circumstances be interpreted as a limitation of this object.

BRIEF DESCRIPTION OF THE DRAWINGS

The present invention will be better understood from a reading of the description of example embodiments given purely by way of indication and in no way limitatively, with reference to the accompanying drawings, on which.

The various parts shown in the figures are not necessarily shown to a uniform scale, to make the figures more legible.

The various possibilities (variants and embodiments) must be understood as not being exclusive of one another and may be combined with one another.

DETAILED DESCRIPTION OF PARTICULAR EMBODIMENTS

The method for manufacturing an aluminium alloy part by additive manufacturing comprises the following successive steps:
  providing a mixture of powders comprising, and preferably consisting of:
  a first powder comprising first particles 10 made from a first material comprising at least 80% by mass aluminium and up to 20% by mass one or more additional elements,
  a second powder comprising second particles 20 made from a second material, the second material being yttrium oxide,
  b) forming a layer of the mixture of powders,
  c) locally melting the layer of the mixture of powders, preferably by sweeping with a laser beam or by sweeping with an electron beam, so as to form a plurality of molten regions,
  d) cooling the plurality melted at step c) so as to form a plurality of solidified regions, this plurality of solidified regions constituting first elements of the parts to be constructed.

Advantageously, steps b), c) and d) can be repeated at least once so as to form at least one other solidified region on the first solidified region. The method is repeated until the final form of the part is obtained. The first layer of powder mixture is formed on a substrate.

Adding particles 20 of yttrium oxide to the first particles 10 of interest based on aluminium makes it possible to obtain an equiaxial solidification structure and a final part made from aluminium alloy without cracking.

Figure 1:
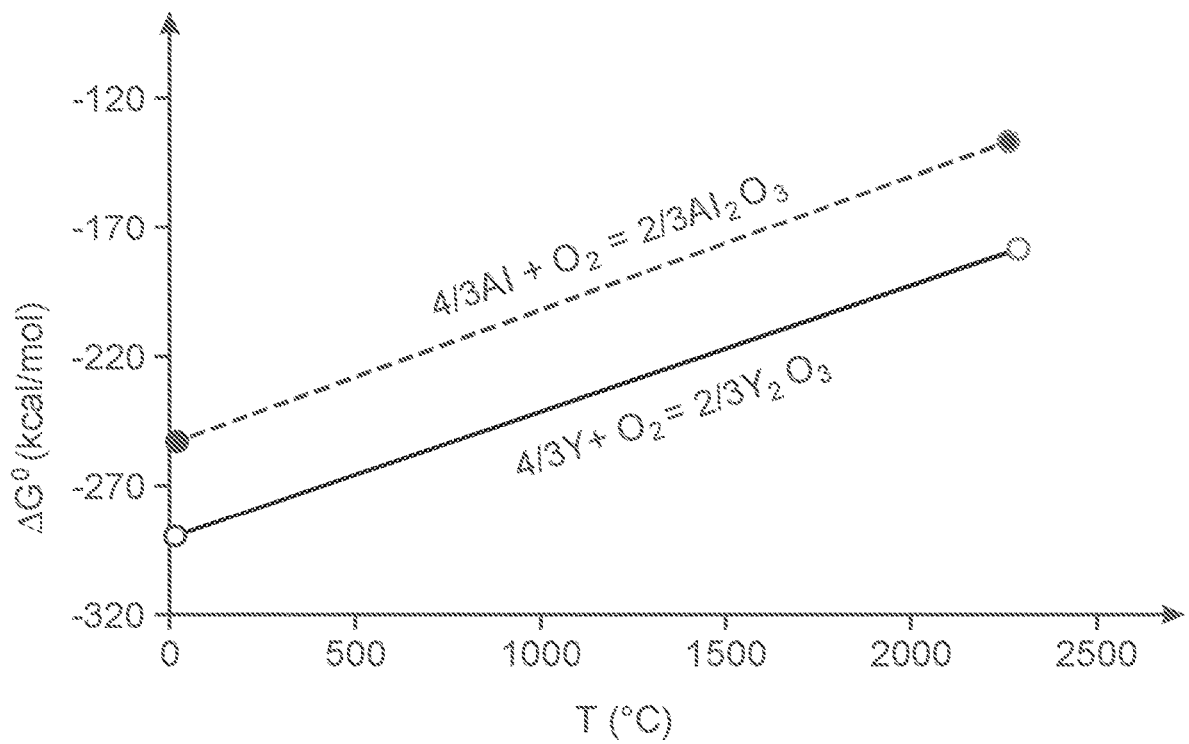
FIG. 1, previously described, is an Ellingham diagram showing the stabilities of aluminium oxide ($Al_2O_3$) and yttrium oxide ($Y_2O_3$), FIG. 2 schematically shows a mixture of powders according to a particular embodiment of the method of the invention.
Figure 2:
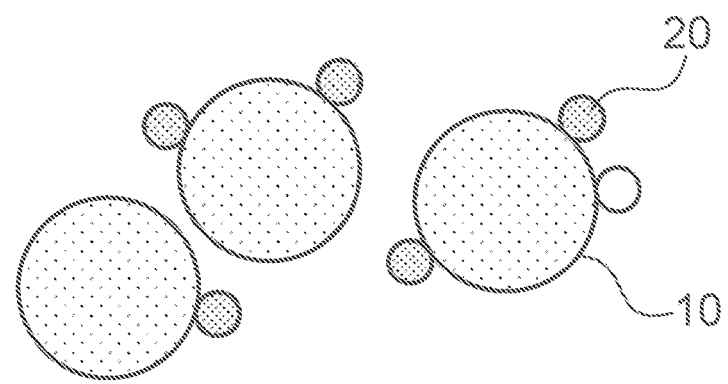

Preferably, the first particles 10 are functionalised by the second particles 20 (FIG. 2).

Preferably, the second particles 20 consist of yttrium oxide.

The second yttrium oxide powder preferably represents from 0.5% to 5% by volume of the mixture of powders, preferably from 1% to 3%.

According to an advantageous embodiment, the first particles 10 have a largest dimension ranging from 10 µm to 100 µm and the second particles 20 have a largest dimension ranging from 5 nm to 2 µm and preferably from 10 nm to 400 nm.

The first particles 10 and the second particles 20 are elements that may be of spherical, ovoid or elongate shape. Preferably, the particles are substantially spherical and the largest dimension thereof is the diameter thereof.

The first powder is formed by first particles 10 made from a first material. The first material comprises at least 80% by mass aluminium.

The first particles 10 may comprise up to 20% one or more additional elements (also referred to as alloy elements). These elements are preferably selected from zinc, magnesium, copper, silicon, iron, manganese, titanium, vanadium, bismuth, lead, nickel, zirconium and chromium. The additional element or one of the additional elements is preferably magnesium.

The alloy is preferably a 7075 aluminium alloy, a 2024 alloy, a 2219 alloy or a 6061 aluminium alloy.

The mixture of powders provided at step a) is produced upstream of the additive manufacturing method.

In a preferential embodiment of the invention, the first powder and the second powder are mixed with a 3D dynamic mixer, for example with a Turbula® mixer. Alternatively, it may be a case of a mechanosynthesis method.

During step c) a sufficiently energetic beam is used for melting at least the first particles 10.

The layer deposited may be locally melted or totally melted.

The melting step makes it possible to create molten patterns in the layer of the powder mixture. One or more regions of molten particles may be produced to form the desired pattern. The particles 10 forming the pattern melt completely so as, when solidification takes place (step d), to lead to one or more solidified regions made from an aluminium alloy.

Advantageously, steps b), c) and d) may be repeated at least once so as to form at least one other solidified region on the first solidified region. The method is repeated until the final form of the part is obtained.

The non-solidified powders are next discharged and the final part is detached from the substrate.

The part obtained according to one of these methods can be subjected to an annealing step (heat treatment) for reducing the internal stresses and improving the mechanical properties.

According to a first variant embodiment, it is a laser melting method on a powder bed (SLM). By way of illustration and non-limitatively, the parameters of the laser melting manufacturing method on powder bed are:
- between 50 and 500 W for the laser power;
- between 100 and 2000 mm/s for the laser speed;
- between 25 and 120 µm for the distance between two vector spaces ("hatch");
- between 15 and 60 µm for the layer thickness.

According to another variant embodiment, it is an electron beam melting method on powder bed (EBM). By way of illustration and non-limitatively, the parameters of the electron beam melting manufacturing method on powder bed are:
- between 50 and 3000 W for the electron beam;
- between 100 and 8000 mm/s for the beam speed;
- between 50 and 150 µm for the distance between two vector spaces;
- between 40 and 60 µm for the layer thickness.

The machines used for the additive manufacturing methods comprise, for example, a powder delivery system, a device for spreading and homogenising the surface of the powder (roller or blade), a beam (for example an infrared laser beam with a wavelength of approximately 1060 nm), a scanner for directing the beam, and a substrate (also called a plate) that can descend vertically (along a Z axis perpendicular to the powder bed).

The assembly can be confined in a closed inerted chamber, for controlling the atmosphere, but also for avoiding dissemination of the powders.

Although this is in no way limitative, the invention particularly finds applications in the energy field, and more particularly heat exchangers, in the aeronautical field, and in the automobile field.

Illustrative and Non-Limitative Examples of an Embodiment

In this example, a part in the form of a cube with dimensions 10 mm*10 mm*12 mm is manufactured by SLM printing.

The part is obtained from a mixture of two powders: an aluminium alloy powder and an yttrium oxide powder.

The granulometry of the aluminium alloy powder (Al6061) is as follows: $d_{10}=27.5$ µm, $d_{50}=41.5$ µm and $d_{90}=62.7$ µm.

Concerning the $Y_2O_3$ powder, the granulometry thereof ranges from 30 nm to 50 nm.

The two powders are mixed in a glove box using: 1200 ml of the aluminium alloy powder to be refined, 24 ml of the yttrium oxide powder (mixture at 2% by volume), and 250 ml of zirconia beads with a diameter of 3 mm, used for homogenising the mixture. The volume of the mixing pot is 6.5 L.

The filling factor, defined as the ratio of the volume represented by the particles 10, the particles 20 and the zirconia beads to the volume of the mixing pot, is approximately 23%.

The mixture is passed through a 3D dynamic mixer, for example a Turbula®, for 10 hours.

The mixture is next coarsely sieved (1 mm) to recover the zirconia beads, and is then used for producing a part by 3D printing.

By way of illustration, the SLM conditions for obtaining the densest cubes are as follows: laser power, 190-270 W; laser speed: 400-800 mm/s, vector space: 100 µm; layer thickness (powder bed): 20 µm.

What is claimed is:

1. A method for manufacturing an aluminium alloy part by additive manufacturing, comprising a step during which a layer of a mixture of powders is locally melted and then solidified, wherein the mixture of powder comprises:
   first particles comprising at least 80% by mass aluminium and up to 20% by mass one or more additional elements, and
   second particles of yttrium oxide.

2. The method according to claim 1, wherein the percentage by volume of second particles in the mixture of powders ranges from 0.5% to 5%.

3. The method according to claim 1, wherein the second particles have a largest dimension ranging from 5 nm to 2 µm.

4. The method according to claim 1, wherein the second particles have a largest dimension ranging from 30 nm to 50 nm.

5. The method according to claim 1, wherein the percentage by volume of second particles in the mixture of powders ranges from 1% to 3%.

6. The method according to claim 1, wherein the first particles have a largest dimension ranging from 10 μm to 100 μm.

7. The method according to claim 1, wherein the first particles have a largest dimension ranging from 20 to 65 μm.

8. The method according to claim 1, wherein the additional elements are selected from Cu, Si, Zn, Mg, Fe, Ti, Mn, Zr, Va, Ni, Pb, Bi and Cr.

9. The method according to claim 1, wherein the aluminium alloy is the 7075 alloy, the 2024 alloy, the 2219 alloy or the 6061 alloy.

10. The method according to claim 1, wherein the manufacturing method is a laser selective melting method.

11. The method according to claim 1, wherein the manufacturing method is an electron beam selective melting method.

12. The method according to claim 1, wherein the powder mixture is produced in a 3D dynamic mixer or by mechanosynthesis.

13. An aluminium alloy particle obtained according to the method as defined in claim 1, wherein it comprises yttrium.

14. A part according to claim 13, wherein the part is a heat exchanger.

* * * * *